United States Patent
Winstanley et al.

[15] 3,654,007
[45] Apr. 4, 1972

[54] METHOD OF FOLDING FABRIC ABOUT A TIRE BEAD

[72] Inventors: Roy D. J. Winstanley, Birmingham; Alfred H. Grossett, Lichfield; Wilfred H. Harrington, Solihull, all of England

[73] Assignee: Dunlop Holdings Limited, London, England

[22] Filed: Nov. 22, 1968

[21] Appl. No.: 778,245

[30] Foreign Application Priority Data

Dec. 1, 1967 Great Britain......................54,826/67

[52] U.S. Cl.............................................................156/132
[51] Int. Cl...........................................................B29h 17/22
[58] Field of Search...................156/131, 132, 136, 128, 133

[56] References Cited

UNITED STATES PATENTS

| | | | |
|---|---|---|---|
| 1,871,438 | 8/1932 | Abbott, Jr. | 156/131 |
| 1,899,088 | 2/1933 | Geer | 156/131 |
| 1,915,668 | 6/1933 | Hoover | 156/131 |
| 3,373,066 | 3/1968 | Hindin | 156/128 |
| 3,374,131 | 3/1968 | Gough | 156/133 |

Primary Examiner—Benjamin A. Borchelt
Assistant Examiner—Stephen C. Bentley
Attorney—Stevens, Davis, Miller & Mosher

[57] ABSTRACT

A method of reducing distortion of the steel cords of a radial ply carcass of a pneumatic tire provided with a bias laid filler strip in the bead region of the tire, during the turn-up of the carcass and the filler strip about the tire bead comprising lubricating the tire elements in the bead region of the tire.

7 Claims, 6 Drawing Figures

Patented April 4, 1972 3,654,007
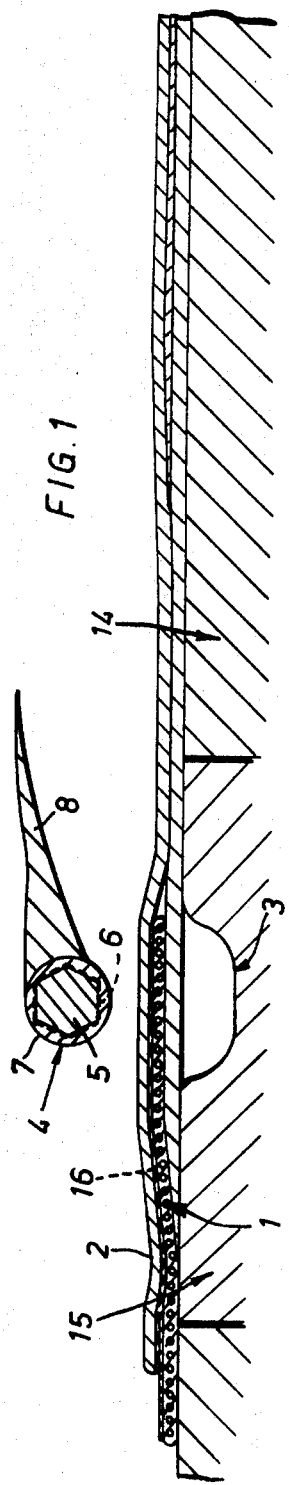
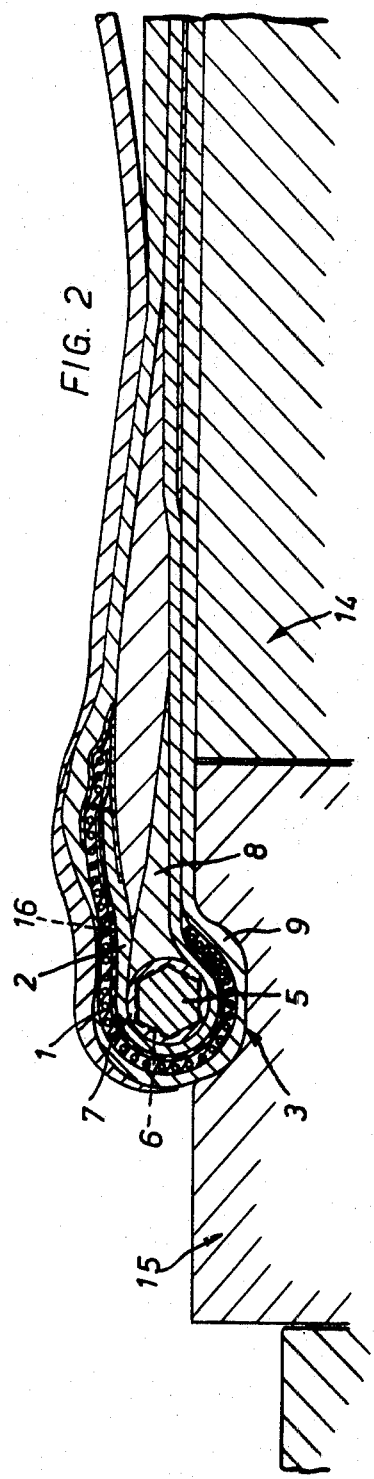
INVENTOR
ROY D.J. WINSTANLEY, ALFRED H. GROSSETT
WILFRED H. HARRINGTON
By Stevens, Davis, Miller & Mosher
ATTORNEYS

METHOD OF FOLDING FABRIC ABOUT A TIRE BEAD

This invention relates to the manufacture of pneumatic tires and more particularly to the manufacture of large tires such as truck and earthmover tires.

During the folding of tire reinforcements around a bead core or the shaping of tire carcasses or during both folding and shaping when reinforcing layers are employed, the cords in one layer crossing the cords in another superimposed layer in the region of the beads, it has been found that mutual distortion of the cords in the bead region of the tire may result. In general said distortion is more pronounced in the folding operation especially when the bead core and reinforcing layers engage within a locating groove circumferentially of an expansible cylindrical tire building drum during manufacture.

It is an object of the present invention to avoid or substantially reduce the aforesaid distortion.

According to the present invention a method of manufacturing a pneumatic tire comprises locating a first rubberized cord reinforcing layer or layers for the bead region of a tire upon a tire building drum, applying a lubricant in two spaced-apart circumferential bands around the first reinforcing layer in positions wherein bead cores subsequently will substantially symmetrically be placed at least one for each band, each band being of a width sufficient to embrace at least substantially a cross-sectional semi-circumference of one of the bead cores, adhering a second rubberized cord reinforcing layer or layers to the drum to sandwich the band of lubricant between itself and said first layer, the cords of the first and second layers crossing one another, locating bead cores in position symmetrically over the bands and subsequently causing the said layers to at least partially fold around the bead cores and shaping the carcass whereby relative slip between said layers is allowed by virtue of said bands of lubricant.

Preferably at least one marginal circumferential region of a superimposed portion of said first reinforcing layer with respect to said second reinforcing layer is devoid of lubricant to enable adhesion to take place between said first and second layers.

In addition to the provision of a band of lubricant sandwiched between the reinforcing layers the bead core may be coated with a layer of lubricant further to assist relative movement between the tire elements. The bead core may be wrapped with a spiral wrapping of fabric to enclose the said lubricant layer.

Said bead core may be constructed by enclosing an assembly of bead wires in a sheath of rubber which may be molded thereon. This aspect of the invention is particularly applicable to assemblies of bead wires of square, hexagonal, octagonal or similar polygonal cross-section to provide a sheath of rubber of substantially circular cross-section and thereby reduce localized distortion of the reinforcing layers folded thereabout by reason of the corners of the assembly of bead wires, this arrangement being described in our co-pending U.K. Pat. No. 1,163,108. Said sheath of rubber or may not be reinforced.

The lubricant comprises a composition such that, after the molding and vulcanization of the tire the properties of the rubber surfaces between which the lubricant acts are not significantly effected, particularly the strength of adhesion between said surfaces.

Preferably the lubricant comprises a solution of approximately 5 parts by weight of zinc stearate per 100 parts by weight industrial alcohol.

An embodiment of the invention will now be described in more detail with reference to the accompanying drawings wherein:

FIG. 1 shows a diagrammatic fragmentary axial cross-sectional view of a bead core and filler in the process of being applied to a carcass ply superposed on a chafer strip mounted on a tire former according to the embodiment of the invention, FIG. 2 shows a diagrammatic fragmentary axial cross-sectional view of the bead region of a tire constructed by a method according to the embodiment of the invention, FIG. 3(a) shows a cross-sectional view of a lubricated hexagonal assembly of bead wires prepared according to the embodiment of the invention, FIG. 3(b) shows a cross-sectional view of a lubricated hexagonal assembly of bead wires to which a spiral wrapping has been applied according to the embodiment of the invention, FIG. 4(a) shows a cross-sectional view of a square assembly of bead wires to which has been applied a sheath of rubber the exterior surface thereof being lubricated according to a modification of the embodiment, FIG. 4(b) shows a cross-sectional view of an assembly of bead wires similar to that shown in FIG. 4(a) to which a spiral fabric wrapping has been applied according to a modification of the embodiment.

According to the embodiment of the invention a pneumatic tire for use on an earthmover vehicle is to be manufactured. The tire comprises one carcass ply 2 having steel cords in side-by-side and substantially parallel relationship disposed substantially at a 90° bias to the mid-circumferential plane of the tire, and a chafer strip 1 of steel cords cut at a bias angle of 30° with respect to the mid-circumferential plane of the tire. The method of manufacture of this tire will now be described with particular reference to FIGS. 1, 2, 3(a) and 3(b).

An assembly of bead wires 5 of hexagonal cross-section is provided with a coating of lubricant 6 comprising 5 parts by weight zinc stearate to 100 parts by weight industrial alcohol, hereinafter referred to as "zinc stearate solution". To the assembly of bead wires 5 so lubricated is applied a spiral wrapping 7 of fabric to enclose the layer 6 of zinc stearate solution. This fabric comprises rubberized textile filamentary material applied in the form of a tape. The tension of the tape on application is controlled so as to allow relative movement between the wrapping of the bead during folding of reinforcements around the completed bead core and shaping of the built carcass and yet to retain the layer of zinc stearate solution. A filler strip 8 is then applied to the bead 4.

After the bead 4 has been so prepared it is in a condition for use in the construction of the tire as will be described hereinafter.

To an inner liner 9 for a tire positioned on an expansible tire former 14 as shown in FIG. 2 are applied two chafer strips 1 one at each end of the tire former 14 in the cylindrical and unexpanded condition of the former. Each chafer strip 1 is arranged to cover a circumferential groove 3 provided on each of the two former end rings 15 to assist in the folding over operation of the reinforcement plies about each bead core and also to enable axial location of the bead region of the tire during the shaping of the tire.

To the racially outer surface of each chafer strip 1 is applied a layer 16 of zinc stearate solution. The zinc stearate solution extends in a circumferential band over the chafer strip 1 the band extending from the axially outermost edge of the chafer strip leaving a marginal portion of the chafer strip devoid of lubricant to enable adhesion to take place between the chafer strip 1 and a superposed carcass ply 2.

The carcass 2 is positioned on the former in superimposed relationship with respect to the chafer strip 1. Two bead cores 4 complete with filler strips 8 prepared as described hereinbefore are applied by expanding the former 14, carcass 2 and chafer strips 1 into the beads 4, which are located co-axially thereof in their respective axial positions of the former 14 so that each bead 4 engages the carcass 2 and becomes seated in its respective groove 3 on the former. The carcass ply 2 and chafer strip 1 are then folded about the bead 4, this operation being considerably facilitated by the presence of the lubricant layers 6 and 16 and also allowing improved accuracy with regard to the angular disposition of the cords of the chafer strip 1 with respect to the mid-circumferential plane of the tire.

Sidewalls tread and other rubber elements are then applied in a manner well-known in the art. The tire is then shaped molded and vulcanized.

In a modification of the embodiments illustrated in FIGS. 4(a) and 4(b) an assembly of bead wires 10 of square cross-section is employed in the tire construction. It is first prepared by encasement in a sheath of rubber 11 to yield an assembly of circular cross-section, the sheath of rubber 11 being applied by molding. The surface of the bead assembly is then treated with a layer 12 of zinc stearate solution and wrapped in rubberized textile filamentary fabric tape 13 to completely enclose the bead 10 and the lubricant 12. A filler strip (not shown) is then attached and in this condition it is applied to the carcass in a manner as described in the embodiment hereinbefore.

It is an advantage of the invention that a tire, manufactured according to the method referred to, is subjected to substantially no distortion between the ply layers, in the bead region, the cords of different relative angular disposition being undistorted despite the severe stresses and strains which are experienced during the folding and shaping operations encountered during the manufacture of the tire, the manufactured tire thus being enabled to perform according to the design characteristics.

Having now described our invention - what we claim is:

1. A method of manufacturing a steel cord radial ply tire comprising locating a first rubberized steel cord reinforcing layer or layers upon a building drum; applying a lubricant to the first layer or layers in the form of two spaced-apart circumferential bands; applying a second rubberized steel cord reinforcing layer or layers to said drum so that the bands of lubricant are sandwiched between said first and second layers; locating bead cores in position over said bands of lubricant and causing said layers to at least partially fold around the bead cores, relative slip between the said layers being allowed during folding by said bands of lubricant and shaping the carcass, the bands of lubricant each being of sufficient width to embrace at least a cross-sectional semi-circumference of one of the band cores, one of said first and second layers comprising a radial carcass ply and the other comprising a strip of bias-cut cord fabric.

2. A method according to claim 1 wherein at least one marginal circumferential region of a superimposed portion of said first reinforcing layer with respect to said second reinforcing layer is devoid of lubricant to enable adhesion to take place between said first and second layers.

3. A method according to claim 1 including coating the bead core with a layer of lubricant further to assist relative movement between the tire elements.

4. A method according to claim 3 including wrapping the bead core with a spiral wrapping of fabric to enclose said lubricant layer.

5. A method according to claim 3 wherein said bead core is constructed by enclosing an assembly of bead wires in a sheath of rubber.

6. A method according to claim 5 including molding said sheath of rubber onto the assembly of bead wires.

7. A method according to claim 1 including the use of a solution of zinc stearate in industrial alcohol as said lubricant.

* * * * *